C. A. MOORE.
Kettle Bottom.
No. 55,145.
Patented May 29, 1866.
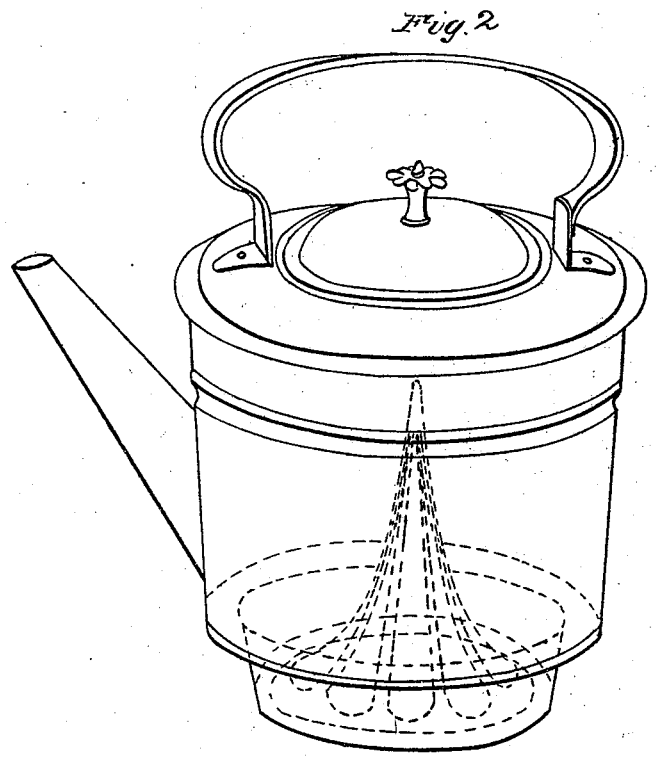
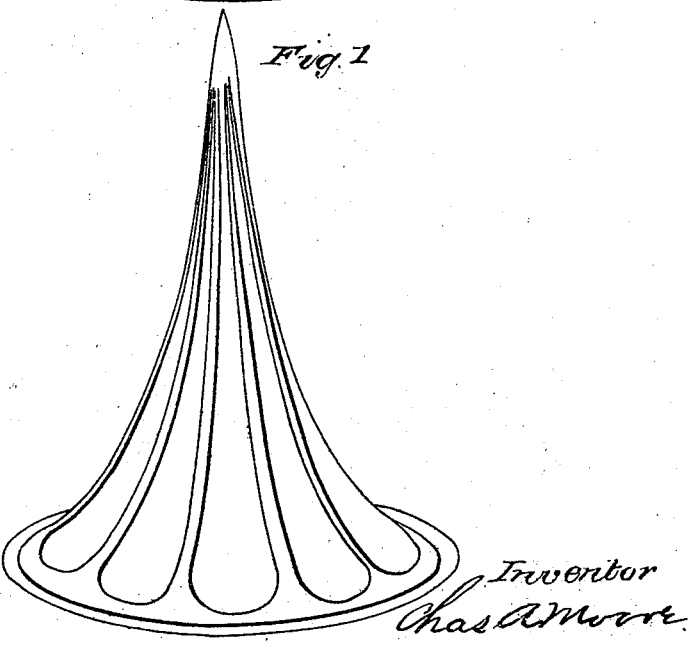

UNITED STATES PATENT OFFICE.

CHARLES A. MOORE, OF WESTBROOK, CONNECTICUT.

IMPROVEMENT IN KETTLE-BOTTOMS.

Specification forming part of Letters Patent No. 55,145, dated May 29, 1866.

*To all whom it may concern:*

Be it known that I, CHARLES A. MOORE, of Westbrook, in the county of Middlesex, in the State of Connecticut, have invented and made a new and useful Improvement in Kettle-Bottoms; and I do hereby declare that the following is a full and exact description thereof, reference being had to the accompanying drawings, and letters of reference marked thereon.

Figure 1 is designed to represent the conically-formed elevation. Fig. 2 shows its position in the kettle, the dotted lines indicating the same.

The nature of my invention consists in the insertion, forming, or making in the bottom of the kettle (said bottom being otherwise in form the same as that ordinarily used on stoves or ranges) a hollow conical or similarly-formed elevation, the base of which being equal to at least one-half that of the bottom of the kettle, making the same of metal or material of less thickness than the rest of the bottom, which is made of ordinary thickness, and stamping, pressing, forming, or fluting it out outwardly, thus rendering its space less inside of the kettle and its outward or fire-surface more susceptible of the heat. It may be made of metal of the same thickness also; but for cheapness thin metal will be used, and to lessen the expensiveness of the brass or copper bottom a cheaper metal may be used for the elevated portion—viz., it may be made of tin or other suitable metal.

The object of my invention is to increase and improve the fire-surface of the kettle-bottom of the form generally used on stoves or ranges for the purpose of heating or boiling water or liquids quicker. The same quantity of water will boil much sooner in a kettle having the above-described improvement in the bottom than in a kettle otherwise of the same dimensions and weight with the ordinary bottom over the same degree of heat.

I claim and desire to secure by Letters Patent—

The above-described improvement in kettle-bottoms, formed substantially as specified, and for the objects set forth.

In witness whereof I have hereunto set my signature this 11th day of January, 1866.

CHAS. A. MOORE.

Witnesses:
   GEO. W. THOMAS,
   A. C. MARSH.